United States Patent [19]
Meijer et al.

[11] 3,783,745
[45] Jan. 8, 1974

[54] GAS-SUPPORTED ROLLING DIAPHRAGM SEAL FOR PISTON AND CYLINDER ASSEMBLY

[75] Inventors: Roelf Jan Meijer; Hendrik Alphons Jaspers, both of Emmasingel, Eindhoven, Netherlands

[73] Assignee: U.S. Philips Corporation, New York, N.Y.

[22] Filed: Dec. 23, 1971

[21] Appl. No.: 211,406

Related U.S. Application Data

[63] Continuation of Ser. No. 26,580, April 8, 1970, abandoned.

[52] U.S. Cl. ............................. 92/83, 60/24, 92/98 D
[51] Int. Cl. ........................... F15b 21/04, F16j 1/19
[58] Field of Search .................. 92/60, 83, 98 RD; 60/24

[56] References Cited
UNITED STATES PATENTS
1,085,818   2/1914   Oxnard ............................. 92/98 X

*Primary Examiner*—Martin P. Schwadron
*Assistant Examiner*—Abe Hershkovitz
*Attorney*—Frank R. Trifari

[57] ABSTRACT

A piston and cylinder element in an assembly as in a compressor or hot gas engine, with a rolling diaphragm seal secured between these elements, with supporting gas on both sides of the seal and a constant pressure differential maintained across the seal.

12 Claims, 5 Drawing Figures

GAS-SUPPORTED ROLLING DIAPHRAGM SEAL FOR PISTON AND CYLINDER ASSEMBLY

This is a continuation, application Ser. No. 026,580, filed Apr. 8, 1970, now abandoned.

BACKGROUND OF THE INVENTION

The invention relates to a device comprising at least one cylinder in which a piston is adapted to reciprocate, with one end of the piston defining and varying the volume of a working space containing a working medium, the other end of the piston bounding a remote buffer space containing a compressible medium; at least one rolling diaphragm is provided between the piston wall and the cylinder wall for separating a first space from a second space, while a substantially constant pressure difference prevails across the rolling diaphragm. Devices of this kind are known and may be utilized with hot-gas reciprocating engines, cold-gas refrigerators, compressors, and the like.

In a device known from French Patent No. 1,326,063, the first space forms part of the working space and the second space is filled with a supporting liquid. The rolling diaphragm is provided for preventing gas from leaking out of the working space and impurities such as lubricants from penetrating into said space.

To the second space (the liquid space) can be supplied liquid (lubricant) by pump means; a control-member ensures that a quantity of liquid is conducted out of the liquid space such that, with a rolling diaphragm having its concave side facing the gas space, the pressure difference across the diaphragm does not drop beneath a given minimum value; and with a rolling diaphragm having its convex side facing the gas space, this pressure difference does not exceed a maximum value.

The present invention has for its object to provide a device of the kind set forth, whose construction is simpler than that of the device disclosed in French Patent No. 1,326,063. The device in accordance with the invention is characterized in that between those parts of the piston and cylinder walls which are located between the rolling diaphragm and the working space, at least one first seal is provided which separates the first space from the working space, the second space also containing a compressible medium at a pressure which exhibits constantly an approximately constant difference from the pressure prevailing in the first space. Owing to the first seal between the first space, and the working space the pressure variations occurring in operation in the working space are not admitted into the first space. The pressure variation in the first space is therefore independent of that in the working space.

The second space now also contains a compressible medium (gas) whose average pressure, when the concave side of the diaphragm faces the first space, is lower than the average pressure in the first space. Conversely, if the convex side of the diaphragm faces the first space, the average pressure in the second space exceeds that of the first space.

The pressure in the first space has always a difference from the pressure in the second space. Because it is ensured that no pressure variations can occur either in the first space or in the second space, or because the phases and amplitudes of the pressure variations occurring in said spaces are equal to each other, the pressure in the first space will always differ by the same amount from the pressure in the second space. In this way a device is obtained in which the rolling diaphragm is supported by a gas instead of being held by a liquid, while it is ensured that the gas pressure on one side of the diaphragm differs by a constant value from the gas pressure on the other side of the rolling diaphragm. The device provides the important advantage, that the aforesaid pumping means and the liquid control-member may be dispensed with, so that a very simple and cheap construction of the device is obtained.

In an advantageous device embodying the invention, the second space is in open communication with the further (remote, buffer) space, and the seal between the piston and cylinder walls is operative across a diameter differing from the effective diameter of the rolling diaphragm, so that the resultant variations of the volume of the first space bring about pressure variations in said space, which are at least approximately equal to and in co-phase with the pressure variations occurring in the further space and the second space communicating therewith, while the average pressure in the first space differs from that in the further space and in the second space.

The term "effective diameter" of the rolling diaphragm has to be understood to denote the diameter of the seal which would have the same effect as the rolling diaphragm and which lies approximately midway between the diameters of the surfaces along which the diaphragm is adapted to roll.

The end of the piston facing the remote space, upon movement of the piston in the cylinder, will vary the volume of the remote space and hence the pressure in the remote space and in the second space communicating with the former, to an extent such as will be determined, for example, by the active surface of said end and by the stroke of the piston. By an appropriate choice of the volume of the first space and of the diameter across which the seal is operative, it is ensured that with a given differing pressure level in the first space and in the second space the pressure variations occurring in the latter space are approximately equal to and in phase with the pressure variations occurring in the first space.

An advantageous embodiment of the invention is a hot-gas reciprocating engine of the displacer type, in which the displacer connecting rod is passed through the piston; apart from the rolling diaphragm between the piston wall and the cylinder wall, which separates the first space from the second space, at least one additional or second rolling diaphragm is provided between the piston and the displacer connecting rod, which separates a third space; from a fourth space, the parts of the piston and the displacer connecting rod located between the second rolling diaphragm and the working space have arranged between them at least one second seal which separates the third space from the working space, the third space communicating with the first space and the fourth space communicating with the remote space, while the first seal and the second seal are each operative across a diameter which differs from the effective diameter of the rolling diaphragm or of the second rolling diaphragm respectively, so that the resultant volume variations upon a movement of the piston and the displacer produce pressure variations in the first and third spaces at least approximately equal to and in phase with the pressure variations in the remote space and in the second and fourth spaces communicating with the former, while the average pressure in the first and third spaces differs from that in the second and fourth spaces.

The pressure variations occurring in the remote space and in the second and fourth spaces communicating herewith as a result of the movements of the piston and of the displacer connecting rod, which are moving with a given relative phase difference, are consequently compensated for by pressure variations produced in the first and third spaces at a pressure level in the second and fourth spaces which differs from the pressure level in the first and third spaces. Therefore with suitably chosen volumes of the first and third spaces and their communicating channel (s), and with a suitably chosen diameter on which the seals between the first and third spaces and the working space are operative, a substantially constant pressure difference will always prevail on the rolling diaphragms.

A further advantageous device embodying the invention is characterized in that between the parts of the piston wall and the cylinder wall located between the rolling diaphragm and the remote space at least one additional third seal is provided, which separates the second space from the remote space, the first and third seals being operative across the same effective diameter as the rolling diaphragm.

The pressure variations occurring in the remote space upon a movement of the piston will no longer become manifest in the second space due to the provision of the third seal. Since both the first seal and the third seal are both operative on a diameter which is equal to the effective diameter of the rolling diaphragm, the volumes of the first and third spaces, upon a movement of the piston in the cylinder, will remain substantially constant. Consequently, these spaces will exhibit substantially no pressure variations so that, because the pressure level in the first space differs from that in the second space, a substantially constant pressure difference will always prevail on the rolling diaphragm.

A further advantageous device embodying the invention, is formed by a hot-gas reciprocating engine of the displacer type, in which the displacer connecting rod is passed across the piston; and apart from the rolling diaphragm between the piston and cylinder walls separating the first space, from the second space at least one additional rolling diaphragm is provided between the piston and the displacer connecting rod, which separates a third space from a fourth space. This embodiment is characterized in that between the parts of the piston and the displacer connecting rod located between the additional rolling diaphragm and the working space, at least one second seal is provided which separates the third space from the working space, while between the parts of the piston and the displacer connecting rod located between the additional rolling diaphragm and the remote space at least one fourth seal is provided which separates the fourth space from the remote space; the first and third seals are operative on a diameter equal to the effective diameter of the rolling diaphragm and the second and fourth seals are operative on a diameter equal to the effective diameter of the additional rolling diaphragm.

The pressure variations in the working space resulting from the movements of the piston and the displacer in the cylinder become manifest neither in the first space nor in the third space owing to the presence of the first and second seals. Neither are the pressure variations in the remote space resulting from relative movements of the piston and the displacer connecting rod and the cylinder passed to the second and fourth spaces respectively owing to the presence of the third and fourth seals respectively. Since furthermore the first and second seals are operative on a diameter which is equal to the effective diameter of the rolling diaphragm, while the third and fourth seals are operative on a diameter which is equal to the effective diameter of the further rolling diaphragm, the volumes of the first, second, third and fourth spaces remain constant upon relative movements of the piston, the displacer rod and the cylinder.

Therefore, no pressure variations occur in said spaces, so that the rolling diaphragm and the additional rolling diaphragm always have a constant pressure difference at the constant, but differing pressure levels in the first and second spaces and the third and fourth spaces respectively.

In a further advantageous device embodying the invention, the first space is in open communication with the third space and the second space with the fourth space. This provides the advantage that if slight pressure variations should occur in one of the spaces, for example due to inaccuracies of dimensions of the structural parts (tolerances), these pressure variations are levelled out in the larger overall volume of the space in which the slight variations occur and in the space communicating therewith.

A further advantageous device embodying the invention is characterized in that the remote space is formed by a hermetically closed crank casing accommodating a driving gear connected with the piston (or the piston and the displacer respectively) and a generator or an electric motor coupled therewith. The device formed by a hot-gas engine having a generator coupled with the driving gear of the crank casing, the electric conductors connected to the generator being taken through the wall of the crank casing to the outside, is extremely suitable for operating for a long, uninterrupted period as an independently operating source of electric energy, while owing to the very simplified construction of the device inspection is carcely required or even not necessary. If the crank casing of the device formed by a cold-gas refrigerator comprises an electric motor, the unit thus obtained can be readily transported and leaves any freedom in the arrangement of, for example, measuring apparatus in laboratories in low-temperature research work.

In a further advantageous device embodying the invention, the seals are formed by piston rings accommodated each in a groove in the wall of the piston of the cylinder or displacer connecting rod respectively, there being constantly an open communication between the space in the associated groove behind the piston ring and one of the two spaces located on either side of the piston ring and being adjacent thereto. If the open communication is constantly present between the space in the groove behind the piston ring and the working space or the space respectively an average pressure will be established in operation of the device in the space between the rolling diaphragm and the piston ring, because the piston ring seal allows a free stream of gas towards the working space and the further space respectively, which average pressure will be lower than the average pressure prevailing in the working space and in the space respectively and approaching the minimum pressure prevailing in said space.

However, if the open communication is established between the space in the groove behind the piston rod and the space between the rolling diaphragm and the piston ring, the average pressure established in the latter space, because the piston ring seal allows gas to pass in the other direction, will exceed the average pressure occurring in the working space and the space respectively and be approximately equal to the maximum pressure in said space.

An adjustment of an average pressure in the first space exceeding the average pressure in the working space may be desired in the case in which the rolling diaphragm is provided as a seal between the piston and the cylinder of a compressor having a suction pressure lower than atmospheric pressure. An adjustment of an average pressure in the first space lower than the average pressure in the working space is advantageous when the second space is in open communication with the remote space so that with a given pressure difference across the rolling diaphragm a lower pressure level will suffice in the second space and in the remote space.

The open communication may be established by providing the piston ring with radial grooves on a side facing either of the two spaces separated by the piston ring or by providing a bore in the piston, the cylinder or the displacer connecting rod respectively.

In a further advantageous device embodying the invention the seals are formed by narrow gaps. The pressure variations in the working space and the remote space are not transferred by these gaps to the spaces between the rolling diaphragms and the gaps. However, gas leakage occurs so that in the operation of the device an average pressure is established in the spaces adjacent the rolling diaphragm, which pressure will be at least approximately equal to the average pressure in the working space and the remote space respectively.

A further advantageous device embodying the invention is characterized in that the compressible medium in the second, fourth and remote spaces is the same medium as that in the working space. In a further advantageous device embodying the invention a channel is provided which joins at one end the working space and at the other end the remote space, said channel including a by-pass valve, which may be spring-loaded and which opens towards the space faced by the concave side(s) of the rolling diaphragm(s).

In practice a slight diffusion of medium across the rolling diaphragm will always occur from one side of the diaphragm of the higher pressure, the concave side, towards the other side of the lower pressure, the convex side. Therefore when the rolling diaphragm has its concave side facing the working space, medium will leak away from the working space to the remote space or conversely; when the rolling diaphragm has its convex side facing the working space, medium will diffuse from the remote space into the working space. In the course of time the pressure levels in the working space and in the remote space will level out, which may result in that the pressure difference across the rolling diaphragm becomes too low and the rolling diaphragm may be damaged by folds.

By an appropriate choice of the initial pressures in the working space and in the remote space and in the spaces adjacent the upper and lower sides of the rolling diaphragms it is now simply possible by means of the channel with the by-pass valve to return medium diffused from the higher-pressure space across the rolling diaphragm into the lower-pressure space to the first-mentioned space.

In this case the pressure variations occurring in the working space and in the remote space respectively are utilized. After the diffusion of medium from the higher-pressure space into the lower-pressure space the pressure occurring in the lower-pressure space for a fraction of a second may exceed the pressure simultaneously prevailing in the higher-pressure space. It is therefore possible for medium to pass during this fraction of the period via the by-pass valve from the lower-pressure space to the higher-pressure space so that the initial pressure difference across the rolling diaphragm is re-established.

The invention will be described more fully with reference, by way of example to the drawing which shows a few embodiments of devices comprising rolling diaphragms seals schematically not to scale.

DESCRIPTION OF THE PREFERRED EMBODIMENT

Figure 1:
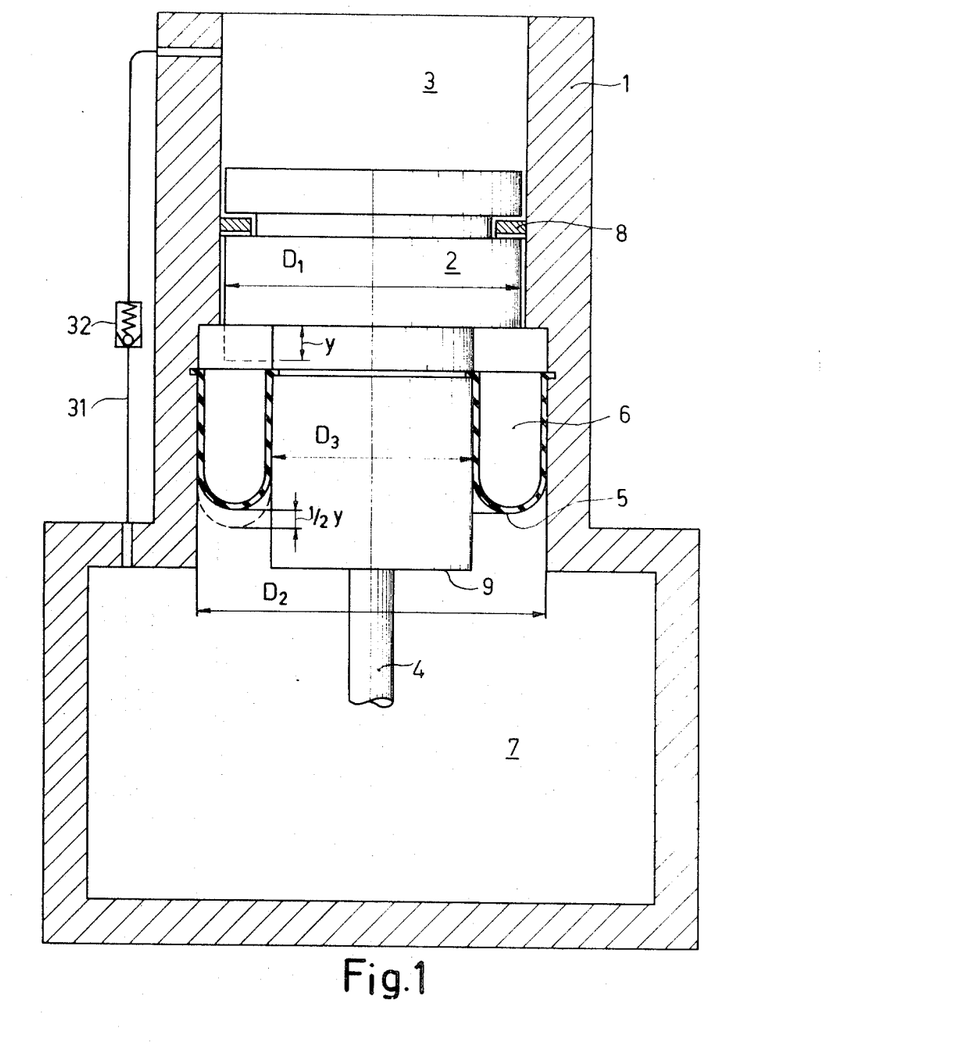
FIG. 1 is a sectional view of a device comprising a rolling diaphragm seal supported by a gas, the space inside the rolling diaphragm being separated by a piston ring seal from the working space.

Referring to FIG. 1, reference numeral 1 designates a cylinder in which a piston 2 is adapted to move, the upper side of which is capable of varying the volume of a working space 3, which contains working medium. The piston 2 is connected through a piston rod 4 with a driving gear (not shown) and has an annular surface 9 on the bottom side. Between the cylinder 1 and the piston 2 a rolling diaphragm 5 provides the seal and separates a medium-containing space 6 from a space 7 containing a compressible medium (gas) at an average pressure lower than the average pressure in the space 6 so that the rolling diaphragm 5 has its concave side facing the space 6. Between the piston wall and the cylinder wall a piston ring 8 is accommodated in a groove of the piston wall, separating the working space 3 from the space 6.

There is furthermore provided a return duct 31, which communicates at one end with the working space 3 and at the other end with the space 7. This duct includes a spring-loaded bypass valve 32, which opens in the direction towards the working space 3. The piston ring 8 is provided on the lower side with radial grooves. Thus there is always an open communication between the space in the groove behind the piston ring and the space 6, so that in the operation of the device leakage of working medium will occur mainly from the working space 3 to the space 6. Therefore an average pressure will be established in the space 6, which pressure will be approximately equal to the maximum pressure prevailing in the working space 3. This may be advantageous, for example, in compressors, when medium of atmospheric pressure is sucked into the working space.

If it is desired in this case to use a rolling diaphragm having its concave side facing the working space, it is necessary for keeping the rolling diaphragm in taut state, to maintain a pressure difference of a few atmospheres, for example, 5 atms., in the direction to the space 7. If in contrast to the construction of FIG. 1, the space 6 is in open communication with the working space, the rolling diaphragm is subjected at a given instant to a pressure in the working space which is lower than the desired space difference across the rolling diaphragm. When the pressure in the working space drops further, the rolling diaphragm will no longer be stretched to the desired extent. This difficulty is now completely obviated by the adjustment of the maximum pressure in the space 6 and in the working space 3 in the manner described above.

The establishment of the maximum pressure may be accounted for as follows: When the pressure in the working space 3 exceeds that in the space 6, the piston ring 8 is urged by its lower side against the lower face of the groove. However, working medium can then always leak from the working space 3 along the radial grooves on the lower side of the piston ring 8 to the space 6. If the pressure in the working space decreases to below the pressure in the space 6, the piston ring comes into contact by its top side with the top face of the groove and will seal the working space 3 with the exception of a slight leak. As a result the average pressure in the space 6 will exceed the average pressure in the working space 3 and be approximately equal to the maximum pressure in said space.

The open communication between the space in the groove behind the piston ring 8 and the space 6 may be obtained in a different way, for example, by providing a bore in the piston. The piston ring 8 has an effective diameter $D_1$ exceeding the effective diameter of the rolling diaphragm 5. If the piston 2 moves over a distance $y$ in downward direction, the rolling diaphragm will be lowered in an average over a distance of $½y$. The space 7 will then exhibit a reduction of volume substantially equal to $y \times S$, wherein $S$ is the surface of the annular face 9 of the piston 2. Since the diameter of operation of the piston ring seal 8 is larger than the effective diameter of the rolling diaphragm, the space 6 also exhibits a reduction of volume when the piston 2 moves downwards over the distance $y$. The reduction of volume amounts to:

$$(\pi/4)(D_1^2 - D_3^2)y - (\pi/4)(D_2^2 - D_3^2)(½y) = (\pi/4)[D_1^2 - (D_2^2 + D_3^2)/2]y,$$

wherein $D_2$ is the outer diameter of the gap accommodating the rolling diaphragm and $D_3$ is the inner diameter. When the piston 2 moves downwards, the pressure in the space 7 and in the space 6 increases due to the reduction of volume. Conversely, an upward movement of the piston 2 brings about an increase in volume and a decrease in pressure in the spaces 6 and 7.

The pressure level in the space 6 is higher than that in the space 7. By a suitable choice of the nominal volume of the space 6 and of the diameter of operation of the piston ring 8, the pressure variations produced by the movement of the piston in the cylinder in the space 6 are equal to and in phase with the pressure variations occurring in the space 7. Consequently, an at least substantially constant pressure difference will prevail across the rolling diaphragm in each stroke.

In practice a slight amount of medium will always diffuse from the space 6 of the higher average pressure through the rolling diaphragm into the space 7 of the lower average pressure. Medium disappearing from the space 6 is replenished from the working space 3 as described above. After some time such a quantity of medium may have diffused through the rolling diaphragm from the working space 3 and the space 6 to the space 7 that the pressure difference across the rolling diaphragm becomes inadmissibly small so that the diaphragm may become defective by the formation of folds. By means of the return duct 31 including the bypass valve 32 medium can be returned from the space 7 to the working space 3, when the nominal pressure levels in these two spaces are suitably chosen. This will be explained further with reference to FIG. 1a. Therein $p_a$ designates the pressure variation in the working space 3 for one period; the curves for $p_b$ indicate two different pressure adjustments in the space 7.

Figure 1A:
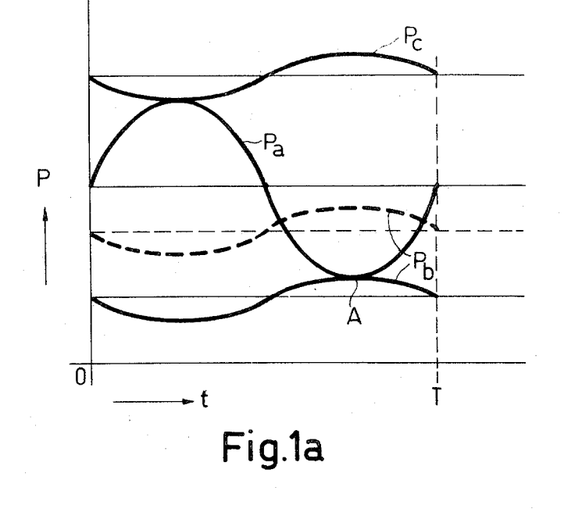
FIG. 1a shows the pressure variation in the various spaces of this device.

The pressure in the space 7 is in phase opposition to the pressure in the working space 3. The pressure level in the space 7 is lower than in the working space. The maximum pressure prevailing in said space is equal to the minimum pressure in the working space 3, which pressures appear at the same instant in operation of the device. The pressure variation $p_c$ in the space 6 is equal in phase and amplitude to that in the space 7, while the pressure level is approximately equal to the maximum pressure in the working space 3 owing to the effect described to the piston ring 8.

When medium diffuses from the working space 3 and the space 6 through the rolling diaphragm 5 to the space 7, so that the pressure level in the working space 3 decreases and that in the space 7 increases, the curves $p_a$ and $p_b$ will intersect each other near the point A. $p_b$ is then momentarily higher than $p_a$ so that medium can be fed back through the bypass valve 32 from the space 7 into the working space 3. The bypass valve 32 is arranged so that it allows medium to pass only in the direction from the space 7 to the working space 3.

In FIG. 1a the solid curve of $p_b$ applies to the situation in which the bypass valve 32 is not loaded by a spring, so that the pressure in the space 7 can never exceed that in the working space 3. The pressure difference across the rolling diaphragm is then of the magnitude of the difference between the maximum and minimum pressures in the working space 3, which difference may be fairly high in given circumstances. If a lower pressure difference across the rolling diaphragm is desired, the bypass valve may be loaded by a spring, as is shown in FIG. 1, so that it opens not until the pressure difference exceeds a given minimum valve corresponding to the counter-pressure exerted by the spring. Then the pressure variation in the space 7 of the kind indicated by a broken line in FIG. 1a is obtained.

In this way a device is obtained in which a constant pressure difference prevails always across the rolling diaphragm in operation wihout the need for the liquid support of the diaphragm, pumping means and control-member conventionally used in the known devices. Altough in accordance with the invention the non-compressible liquid support is replaced by a support of the rolling diaphragm by a compressible medium, the aforesaid measures ensure nevertheless that the rolling diaphragm is not affected by variations in length so that its lifetime is long.

Figure 2:
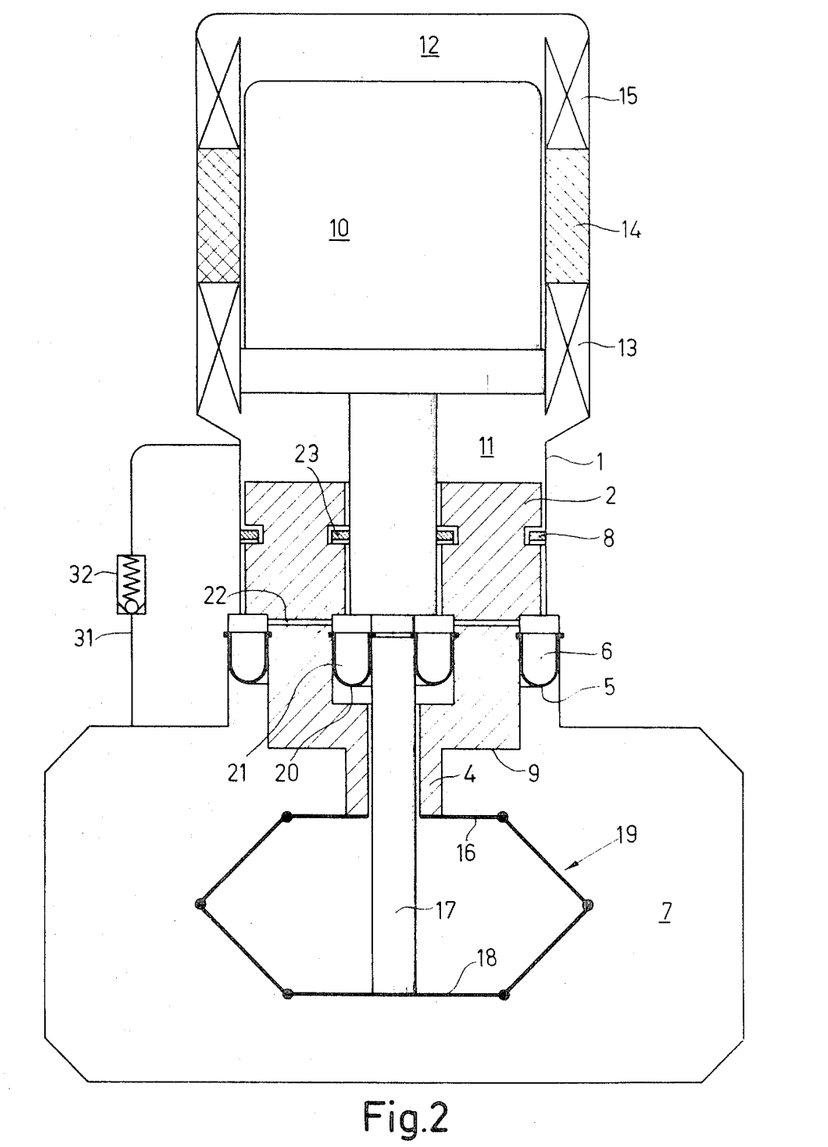
FIG. 2 is a sectional view of a hot-gas engine of the displacer type comprising rolling diaphragm seals with gas support, the spaces inside the two rolling diaphragms being separated by piston ring seals from the working space.

FIG. 2 is a sectional view of a hot-gas engine; corresponding parts are designated by the same reference numerals as in FIG. 1. In a cylinder 1 a piston 2 and a displacer 10 are adapted to reciprocate. The piston 2 varies by its upper face the volume of a compression space 11, whereas the upper face of the displacer 10 varies the volume of an expansion space 12. These two spaces communicate with each other via a cooler 13, a regenerator 14 and a heater 15 and are filled with working medium. The piston 2 is fastened by a hollow piston rod 4 to a yoke 16, whereas the displacer 10 is connected with a yoke 18 by a displacer rod 17, passed through the piston 2 and the hollow piston rod 4. The yokes 16 and 18 form part of a rhombio driving gear designated by 19 and arranged in the space 7, forming a crank casing and also containing working medium.

Between the cylinder 1 and the piston 2, a rolling diaphragm 5 separates a space 6 from the space 7. There is furthermore provided a rolling diaphragm 20 between the piston 2 and the displacer rod 17, said diaphragm separating a space 21 from the space 7. The space 6 communicates through a channel 22 freely with the space 21. The rolling diaphragms ensure that working medium of the compression space cannot penetrate into the crank casing and impurities such as lubricating oil cannot pass from the crank casing 7 into the compression space 11.

Between the piston wall and the cylinder wall and the piston wall and the displacer rod wall piston rings 8 and 23 respectively are provided, which are each accommodated in a groove in the piston wall. These piston rings separate the spaces 6 and 21 from the compression space 11. The piston rings 8 and 23 are provided on their lower sides with radial grooves. Consequently, there is always an open communication between the spaces in the grooves behind the piston rings and the spaces 6 and 21 so that in the operation of the device gas leakage will take place mainly from the compression space 11 into the spaces 6 and 21. As a result, an average pressure will be established in the spaces 6 and 21, which pressure will be higher than the average pressure in the compression space 11 and be approximately equal to the maximum pressure in the compression space. In operation the piston 2 with the piston rod 4 and the displacer 10 move with a given phase difference in the cylinder 1.

The extent of the volume variation of the space 7 is mainly determined by the surface of the annular face 9 of the piston 2 and the length of the piston stroke. In addition small volume variations are produced by the movements of the piston rod and the displacer rod, determined by the surfaces of the lower sides of said rods and by the lengths of the strokes of said rods. The volume variation produced by the displacer rod is different in magnitude and phase from that produced by the combination of piston and piston rod. Summation of these two volume variations results in a given variation of the volume of the space 7, which involves a given pressure variation of the medium in said space, which has an average pressure level below the average pressure levels in the spaces 6 and 21.

By an appropriate choice of the volumes of the spaces 6 and 21 and of the diameters of operation of the piston rings 8 and 23 it is ensured that with a given pressure level in said spaces during the movements of the piston and the displacer in the cylinder a pressure variation is obtained which always differs by a constant amount from the pressure variation in the space 7. The pressure variations in the two spaces are therefore equal to and in phase with each other. Medium diffused through the rolling diaphragm 5 and 20 is conducted back to the compression space 11 via the bypass valve 32 in the manner described with reference to FIG. 1.

Figure 3:
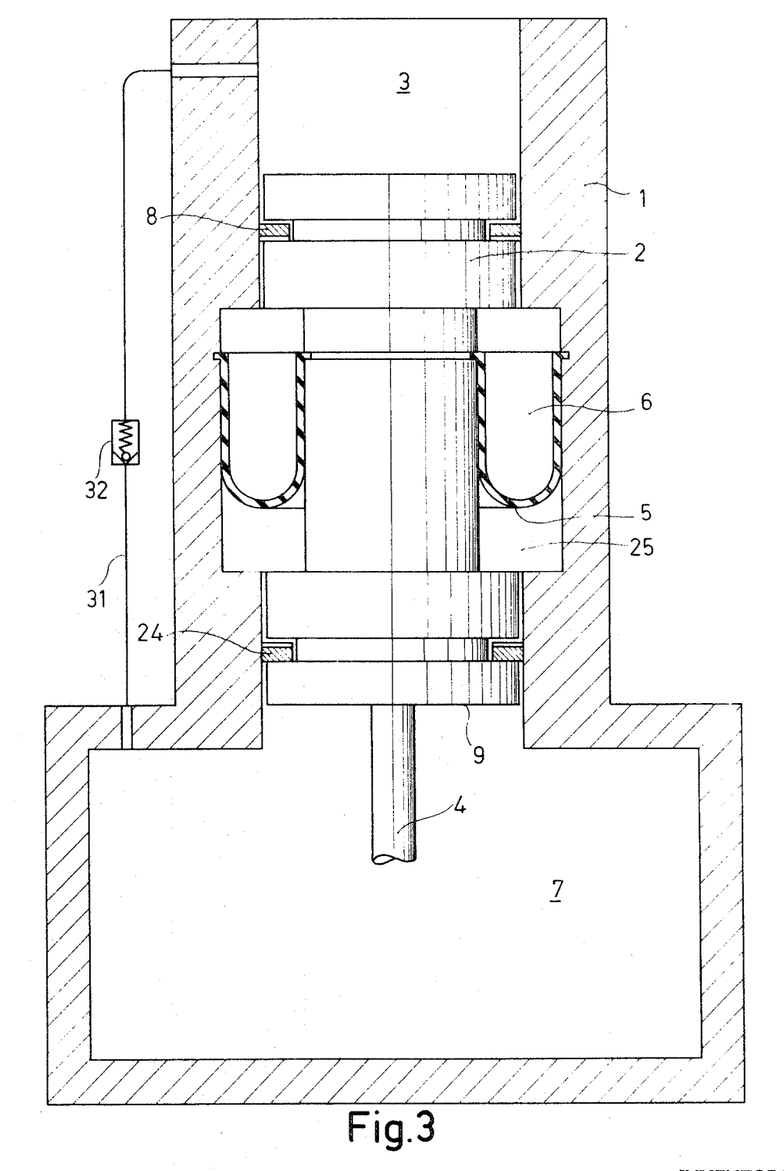
FIG. 3 is a sectional view of a device comprising a rolling diaphragm seal with gas support, the space above and the space below the rolling diaphragm being separated by a piston ring seal from the working space and the further space respectively.

FIG. 3 shows a device corresponding largely with the device shown in FIG. 1. Corresponding parts are therefore designated by the same reference numerals. Apart from the piston ring 8, separating the space 6 from the working space 3, this device comprises a piston ring 24 separating a space 25 from the space 7. The piston rings 8 and 24 are both operative on a diameter equal to the effective diameter of the rolling diaphragm 5. Upon a movement of the piston 2 in the cylinder 1 the volume of the spaces 6 and 25 will remain constant so that no pressure variations occur in this space owing to volume variations, whereas the pressure variations in the working space 3 and the space 7 respectively are not transferred by the piston rings 8 and 24 respectively to the space 6 and the space 25 respectively. Therefore, in each stroke a substantially constant pressure difference will prevail across the rolling diaphragm. Medium diffused through the rolling diaphragm 5 into the space 7 is again returned via the bypass valve 32 into the working space 3.

Figure 4:
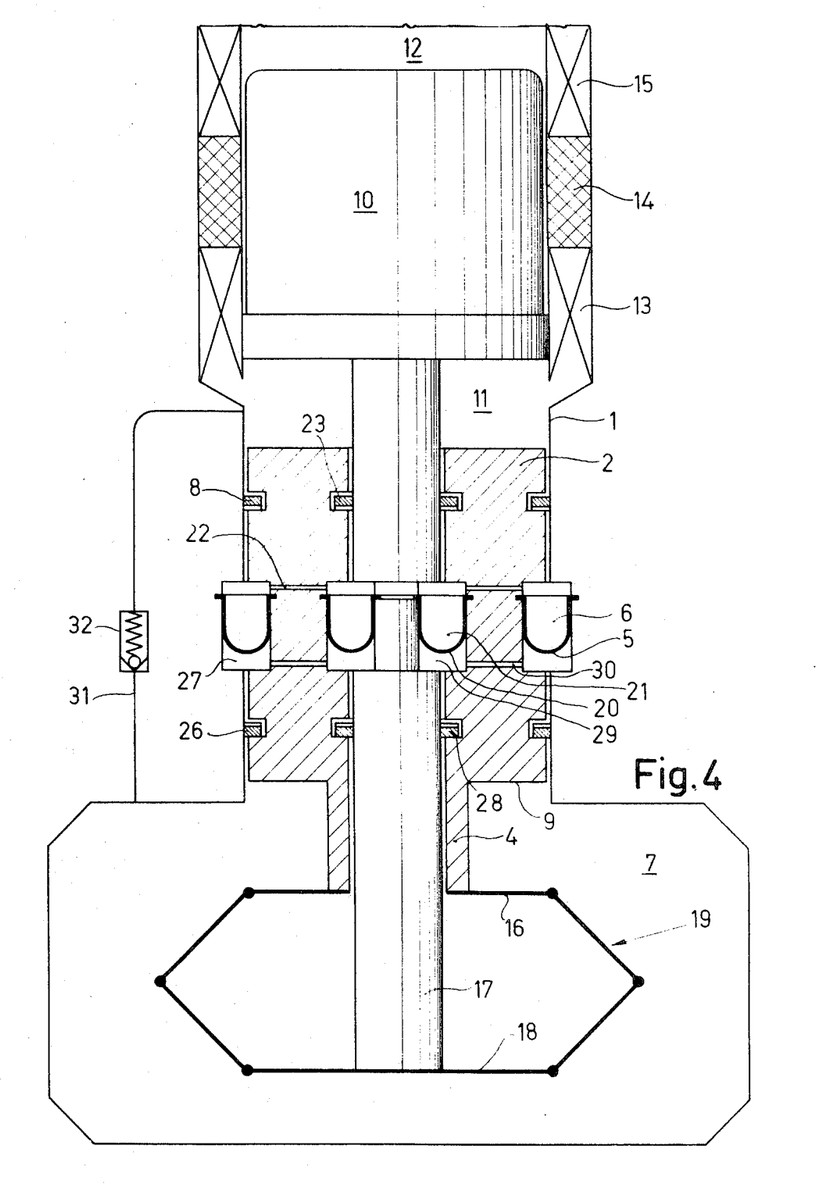
FIG. 4 is a sectional view of a hot-gas engine of the displacer type comprising gas-supported rolling diaphragm seals the spaces inside the two rolling diaphragms being separated by piston ring seals from the working space, while the space beneath the rolling diaphragms is separated by piston ring seals from the crank casing.

FIG. 4 shows an embodiment of a hot-gas engine of the displacer type, which corresponds mainly with the device shown in FIG. 2, so that corresponding reference numerals are used. Apart from the piston rings 8 and 23 separating the spaces 6 and 21 from the compression space 11, a piston ring 26 is provided here between the piston wall and the cylinder wall, which ring separates a space 27 beneath the rolling diaphragm 5 from the space 7, while a piston ring 28 is provided between the piston wall and the displacer wall, which separates a space 29 beneath the rolling diaphragm 20 from the space 7.

The piston rings 8 and 26 are both operative on the same diameter as the effective diameter of the rolling diaphragm 5, whereas the piston rings 23 and 28 are both operative on a diameter equal to the effective diameter of the rolling diaphragm 20. This means that upon a relative movement of the piston and the cylinder and the displacer respectively, the volumes of the spaces 6, 21, 7 and 29 remain constant, so that no pressure variations will occur in said spaces. The pressure variations in the compression space 11 are not transferred by the piston rings 8 and 23 respectively to the spaces 6 and 21 respectively whereas the pressure variations occurring in the space 7 cannot penetrate into the spaces 27 and 29 respectively because they are retained by the piston rings 26 and 28 respectively.

The result is that on either side of the rolling diaphragm constant, but relatively different pressures are always prevailing. The spaces 6 and 21 communicate with each other by a channel 22 and the spaces 27 and 29 are in open communication with each other via a channel 30. This has the advantage that in case of any slight pressure variations in one of the spaces in the operation of the device, for example, due to tolerances of the relatively co-operating parts, these variations are levelled out since said space communicates with a further space. Also this device comprises a return duct 31 with a bypass valve 32 so that medium diffused through the rolling diaphragms 5 and 20 into the space 7 is fed back into the compression space 11.

Although in the drawing the rolling diaphragms are all shown in a position in which the concave sides face the working space and the compression space respectively, it is of course also possible, while maintaining the same advantages, to have the rolling diaphragms face their convex sides to the said spaces. As shown in the drawing the seal between the space adjacent the rolling diaphragm and the working space or compression space or the further space is formed by only one piston ring. It will be obvious that this seal may be formed by a plurality of piston rings.

It is furthermore shown that the piston ring has its side provided with radial grooves facing the rolling diaphragm so that in the space adjacent the rolling diaphragm a pressure will be established which is approximately equal to the maximum pressure in the other space adjacent the piston ring. As a matter of course the piston ring may be arranged in the groove so that the side provided with the radial grooves is remote from the rolling diaphragm. The pressure then established in the space between the rolling diaphragm and the piston ring is then approximately equal to the minimum pressure in the space adjacent the side of the piston ring provided with the radial grooves. The open communication between the space in the groove behind the piston ring and one of the two spaces separated by said piston ring may also be formed by the upper or lower surface of the groove in the piston-, cylinder- or displacer wall provided with radial slots or with bores.

Under given conditions the seal may also be formed by a narrow gap, in which case the average pressure prevailing on the other side of the seal in the working space, the compression space or the further space will be produced in the space between the rolling diaphragm and the seal.

From the foregoing it will be obvious that the invention provides an extremely simple construction of a device comprising rolling diaphragms between piston, cylinder or rod, which diaphragms are on one side in contact with a gas-filled space, for example, a working space and on the other side with a gas supporting them, while a constant pressure difference always prevails across these rolling diaphragms.

What is claimed is:

1. Compression apparatus comprising a cylinder, a piston axially movable in the cylinder, the piston having an outer body part with opposite compression and remote end parts, the piston and cylinder having a first set of adjacent walls corresponding to said body part remote end of the piston and defining a first annular space between said walls, and a second set of adjacent walls corresponding to said compression end part of the piston and defining a second annular space therebetween, the compression end of the piston defining with the cylinder a variable volume compression space for working medium containable therein, a rolling diaphragm seal secured between said first set of walls and defining and separating said first annular space into axially spaced first and second portions thereof for containing compressible medium at relatively different average pressures, a second seal disposed in said second annular space, axially between said first portion of the first annular space and the compression space, the second seal having an operative diameter unequal to the effective diameter of said first rolling seal and operative as a one-way valve for providing a constant pressure differential across said first seal.

2. Apparatus according to claim 1 wherein said rolling seal has a concave side facing said second seal, and said second seal permits gas flow only toward the rolling seal from the compression space.

3. Apparatus according to claim 1, wherein at least one of the walls of said first set has a stepped diameter such that the volume of said first outer annular space remains constant during axial movement of the piston.

4. Apparatus according to claim 1 wherein said second portion of the first outer annular space is in open communication with the remote space, the second seal (having an operative diameter different from the effective diameter of the rolling diaphragm) produces volume variations of the first portion of the first outer annular space and resultant pressure variations in said first portion space which are at least substantially equal to and in phase with the pressure variations occurring in the remote space and in the second portion of the first outer annular space communicating therewith, the average pressure in said first portion differing from that in the remote space and in the second portion.

5. Apparatus according to claim 1 wherein said piston's remote end and the cylinder define a third set of adjacent walls defining a third annular space, the apparatus further comprising a third seal disposed in said third annular space, this third seal being operative on the same diameter as the effective diameter of the rolling diaphragm.

6. Apparatus according to claim 1 wherein said second seals comprise piston rings, and said apparatus includes for each ring a groove in one of the adjacent walls of said piston and cylinder, and displacer-connecting rod and piston, and communication means is provided between said groove and one of said two spaces on the opposite sides of said seal.

7. Apparatus according to claim 1 wherein said second seals are formed by narrow gaps.

8. Apparatus according to claim 1 further comprising duct means communicating said working space with said remote space, a by-pass valve within said duct means opening toward said working space which is facing the concave side of said rolling diaphragm seal.

9. Apparatus comprising a cylinder, a piston axially movable in the cylinder, the piston having a body part and a compression end part, the latter part cooperating with the cylinder to define a variable volume working space containing a working medium, the cylinder and piston having first and second pairs of adjacent wall surfaces corresponding respectively to said body and end parts of the piston, a first rolling diaphragm seal secured between said first adjacent surfaces and separating a first annular space from a second annular space, these spaces containing working medium of different average pressures, a first ring seal secured between said second adjacent surfaces and separating said first annular space from said working space, at least one of said piston and cylinder wall surfaces extending between said first rolling seal and said first ring seal defining a stepped construction, and said first ring seal having an effective diameter substantially equal to that of the first rolling seal, such that the pressure differential between the first and second annular spaces across said first rolling seal is substantially constant.

10. Apparatus according to claim 9 wherein the piston has the remote end opposite the compression end and the piston remote end and the corresponding cylinder part have third adjacent wall surfaces, the apparatus further comprising a second ring seal secured between said third adjacent surfaces with the second annular space between said first rolling seal and said second ring seal, this second ring seal having An effective diameter equal to that of the first ring seal.

11. In a hot-gas engine including a cylinder, a compression piston reciprocally movable in the cylinder, a displacer to which is connected a displacer rod that extends through the bore in said piston with a variable volume compression space defined between said piston and displacer, said piston having a body part and a compression end part, the cylinder and piston having first and second adjacent wall surfaces corresponding respectively to the body and compression end parts of said piston, a first rolling diaphragm secured between said first adjacent surfaces and separating a first annular space from a second annular space, these spaces containing working medium at different average pressures, a first ring seal secured between said second adjacent surfaces and separating said first annular space from said compression space, at least one of said piston and cylinder wall surfaces extending between said first rolling seal and said first ring seal defining a stepped construction, said first ring seal having an effective diameter substantially equal to that of the rolling seal, such that the pressure differential between said first and second annular spaces across said rolling seal is substantially constant, said apparatus further comprising third and fourth adjacent wall surfaces between said rod and piston bore and similar to said first and second adjacent wall surfaces and rolling and ring seals therebetween.

12. An engine according to claim 11 wherein said piston has a remote end opposite the compression end, and the piston remote end and corresponding cylinder part have fifth adjacent wall surfaces, and said piston remote end and displacer rod therethrough also have sixth adjacent wall surfaces, the apparatus further comprising third and fourth ring seals secured respectively between the fifth and sixth adjacent wall surfaces, said third and fourth ring seals each having an effective diameter equal to that of the first and second ring seals respectively, such that the pressure differential across the rolling diaphragm seals is substantially constant.

* * * * *

UNITED STATES PATENT OFFICE
CERTIFICATE OF CORRECTION

Patent No. 3,783,745   Dated January 8, 1974

Inventor(s) Roelf Jan Meijer et al.

It is certified that error appears in the above-identified patent and that said Letters Patent are hereby corrected as shown below:

In the Title Page: After "Related U. S. Application Data Continuation of Ser. No. 26,580, April 8, 1970 abandoned." insert -- Foreign Application Priority Data
April 17, 1969 Netherlands ......6905902

Col. 5, line 1, before "space" insert -- remote -- line 9, before "space" (second occurrence) insert -- remote --

Col. 4, line 61, before "space" second occurrence insert -- remote --.

Signed and sealed this 3rd day of September 1974.

(SEAL)
Attest:

McCOY M. GIBSON, JR.
Attesting Officer

C. MARSHALL DANN
Commissioner of Patents